US009939965B2

(12) United States Patent
Sundara-Rajan

(10) Patent No.: US 9,939,965 B2
(45) Date of Patent: Apr. 10, 2018

(54) SENDING DRIVE SIGNALS WITH AN INCREASED NUMBER OF PULSES TO PARTICULAR DRIVE LINES

(71) Applicant: Kishore Sundara-Rajan, San Jose, CA (US)

(72) Inventor: Kishore Sundara-Rajan, San Jose, CA (US)

(73) Assignee: Atmel Corporation, Chandler, AZ (US)

( * ) Notice: Subject to any disclaimer, the term of this patent is extended or adjusted under 35 U.S.C. 154(b) by 669 days.

(21) Appl. No.: 13/711,105

(22) Filed: Dec. 11, 2012

(65) Prior Publication Data

US 2014/0160036 A1  Jun. 12, 2014

(51) Int. Cl.
*G09G 1/00* (2006.01)
*G06F 3/044* (2006.01)

(52) U.S. Cl.
CPC .................................. *G06F 3/044* (2013.01)

(58) Field of Classification Search
CPC ...... G06F 3/0317; G06F 3/0416; G06F 3/044; G06F 3/041; G06F 1/00; G06F 3/0412; G06F 2203/04103; G09G 1/00; G09G 3/3677
See application file for complete search history.

(56) References Cited

U.S. PATENT DOCUMENTS

| 7,663,607 | B2 | 2/2010 | Hotelling |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 8,816,985 | B1 * | 8/2014 | Tate et al. ............. 345/173 |
| 2006/0012581 | A1 * | 1/2006 | Haim et al. .......... 345/173 |
| 2009/0315854 | A1 | 12/2009 | Matsuo |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |

FOREIGN PATENT DOCUMENTS

WO  WO 2012/129247  9/2012

OTHER PUBLICATIONS

U.S. Appl. No. 61/454,936, filed Mar. 21, 2011, Myers.
U.S. Appl. No. 61/454,920, filed Mar. 21, 2011, Lynch.
U.S. Appl. No. 61/454,894, filed Mar. 21, 2011, Rothkopf.

* cited by examiner

*Primary Examiner* — Michael Faragalla
(74) *Attorney, Agent, or Firm* — Baker Botts L.L.P.

(57) ABSTRACT

In one embodiment, a method includes detecting a touch of an object on a device. The method also includes predicting an area of the device that the detected touch will move to. The method further includes sending a first set of drive signals to one or more drive lines within the predicted area, the first set of drive signals each having a first number of pulses. The method further includes sending a second set of drive signals to one or more drive lines outside the predicted area, the second set of drive signals each having a second number of pulses. Furthermore, the first number of pulses is greater than the second number of pulses.

20 Claims, 4 Drawing Sheets

SENDING DRIVE SIGNALS WITH AN INCREASED NUMBER OF PULSES TO PARTICULAR DRIVE LINES

TECHNICAL FIELD

This disclosure generally relates to touch screen technology.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as, for example, resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
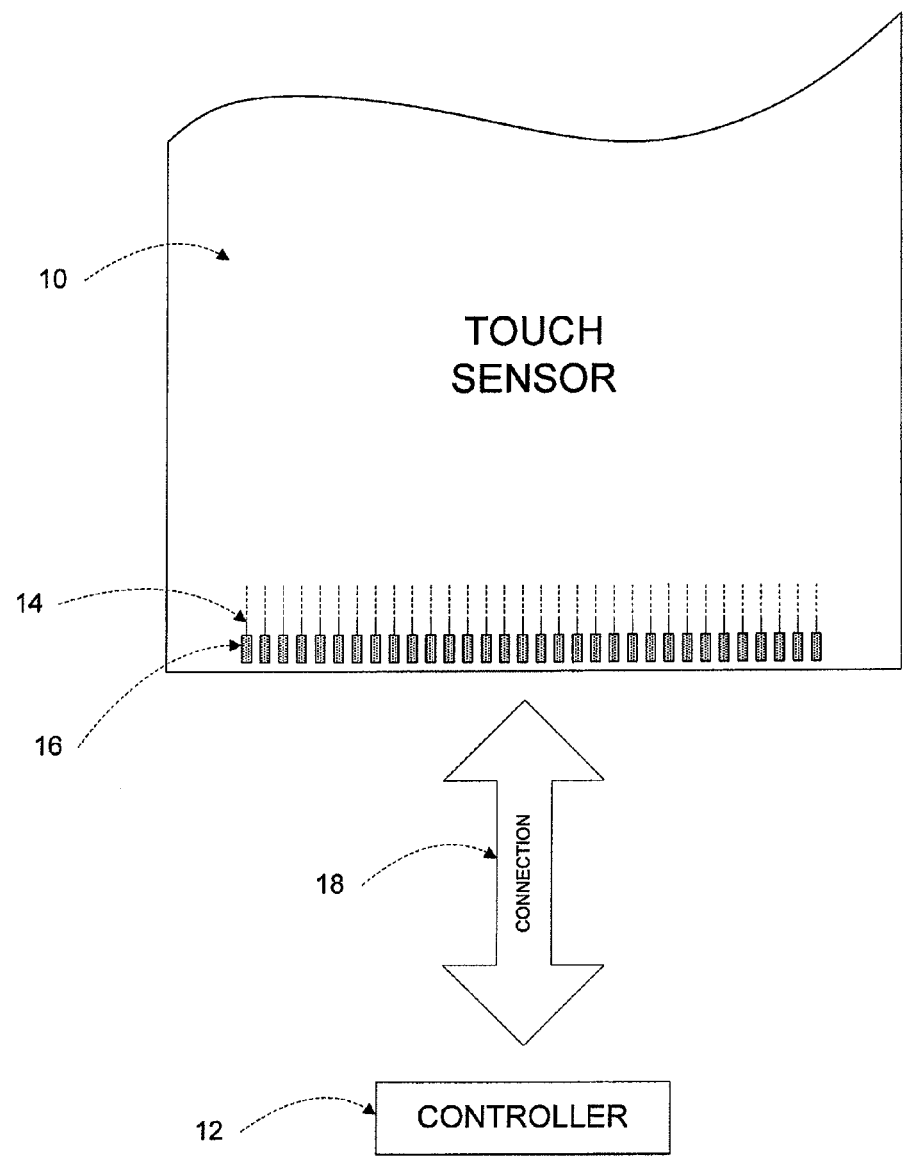
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

As is discussed above, in order to detect the presence and location of a touch or the proximity of an object within a touch-sensitive area of a touch sensor, touch-sensor controller 12 may send drive signals to drive lines (which include one or more drive electrodes) of a touch sensor 10. These drive signals may each include a particular number of pulses. For example, each drive signal may include a number of pulses in-between 8 pulses and 63 pulses, in particular embodiments. As another example, each drive signal may include any other suitable number of pulses. The number of pulses included in a drive signal may correspond to the signal to noise (SNR) ratio of touch sensor 10, the frame rate of touch sensor 10, and/or the power consumption of touch sensor 10. For example, increasing the number of pulses in each drive signal (such as, for example, increasing the number of pulses from 12 pulses to 22 pulses) may increase the SNR ratio of touch sensor 10 (which may be beneficial because a low SNR may lead to spurious touches, breaks in touch tracks, and various other deficiencies). Unfortunately, increasing the number of pulses in each drive signal may also lower the frame rate of touch sensor 10 and increase the power consumption of touch sensor 10, both of which are problematic. For example, particular devices in which touch sensor 10 may be used may be designed to operate at higher frame rates, such as frame rates of at least 100 Hz. As such, the number of pulses included in a drive signal may be problematic. Such problems may be even more prevalent for devices that operate using an active stylus (such as a stylus that may detect one or more pulses of a drive signal and respond by, for example, injecting a charge at a capacitive node of a touch sensor). For example, particular active styluses may be designed to work with drive signals that include at least 22 pulses. Unfortunately, as is discussed above, increasing the number of pulses in drive signals sent to each drive line in touch sensor 10 may decrease the frame rate of the touch sensor 10 and increase power consumption of the touch sensor 10.

Figure 2:
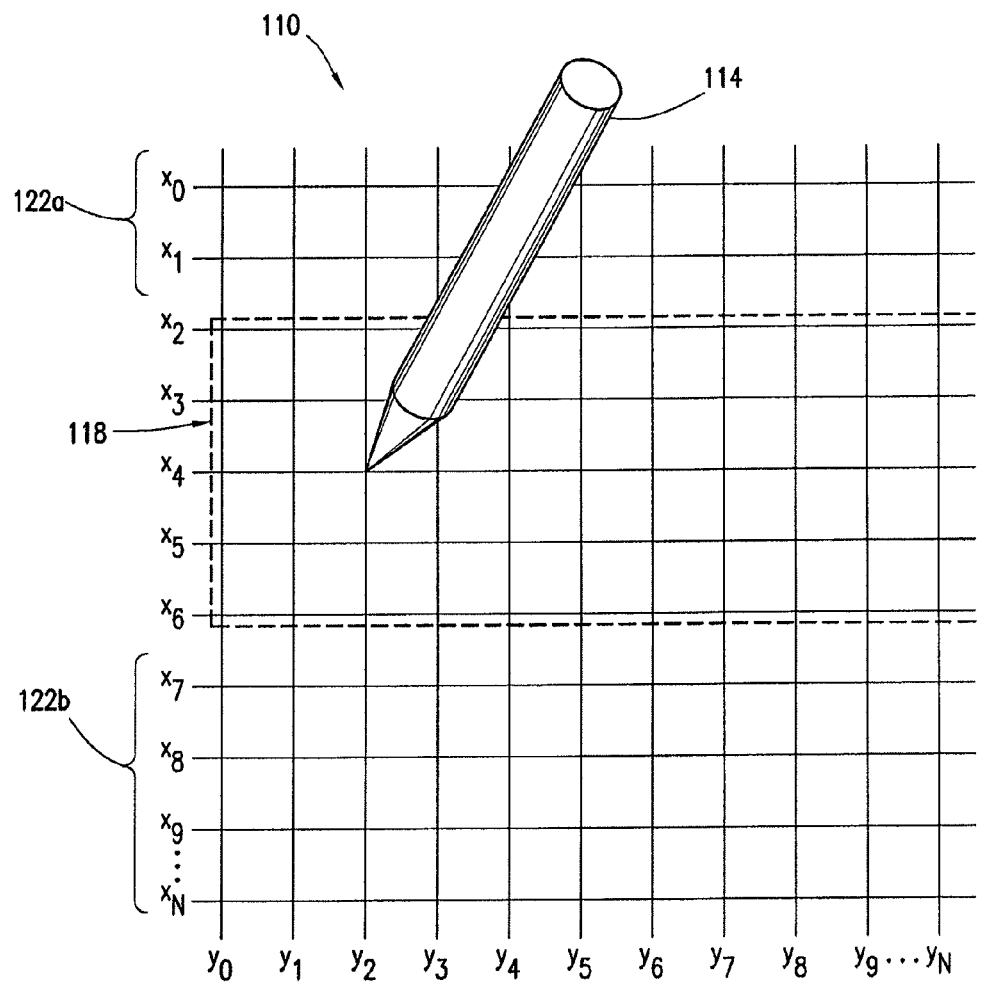
FIG. 2 illustrates an example touch sensor where drive signals with an increased number of pulses are sent to particular drive lines.
Figure 3:
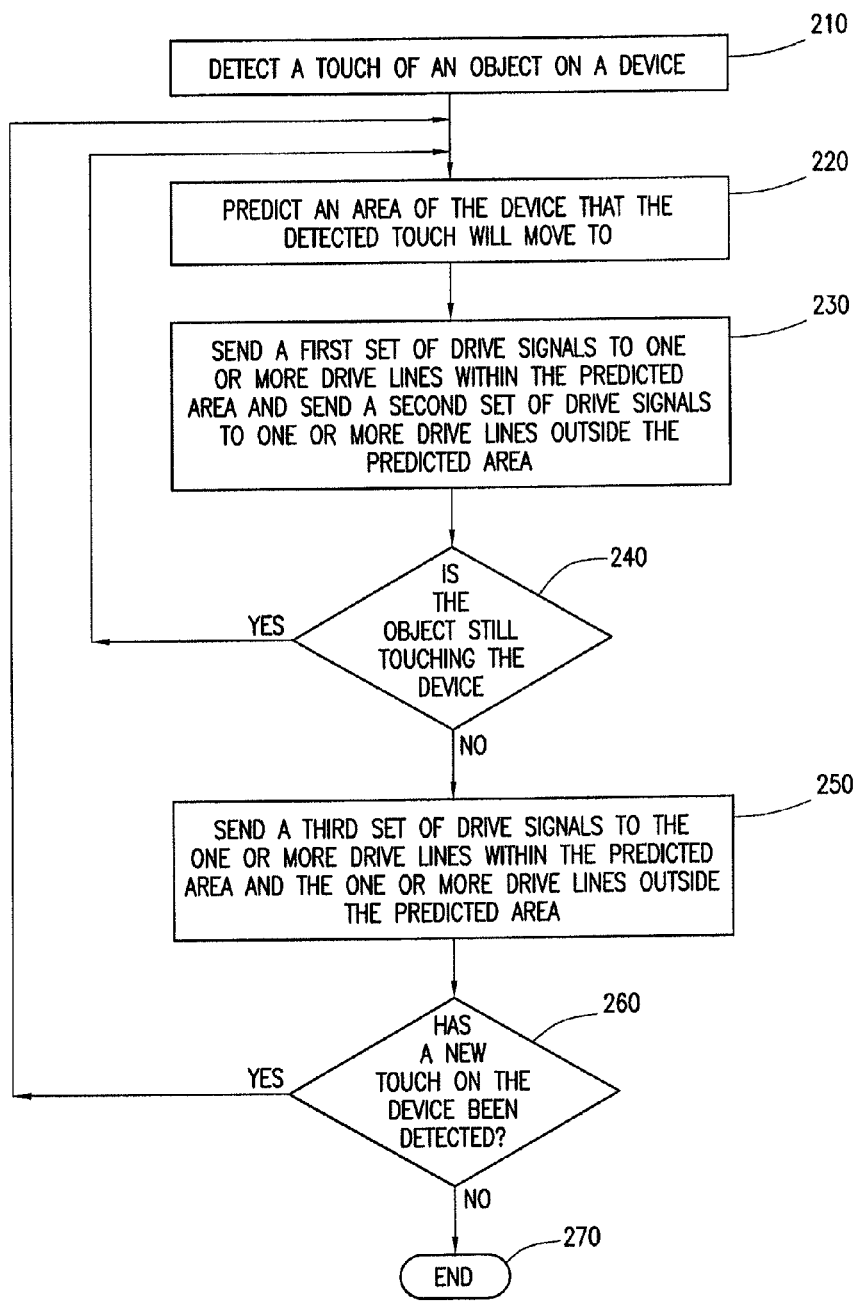
FIG. 3 illustrates an example method for sending drive signals with an increased number of pulses to particular drive lines of a touch sensor.
Figure 4:
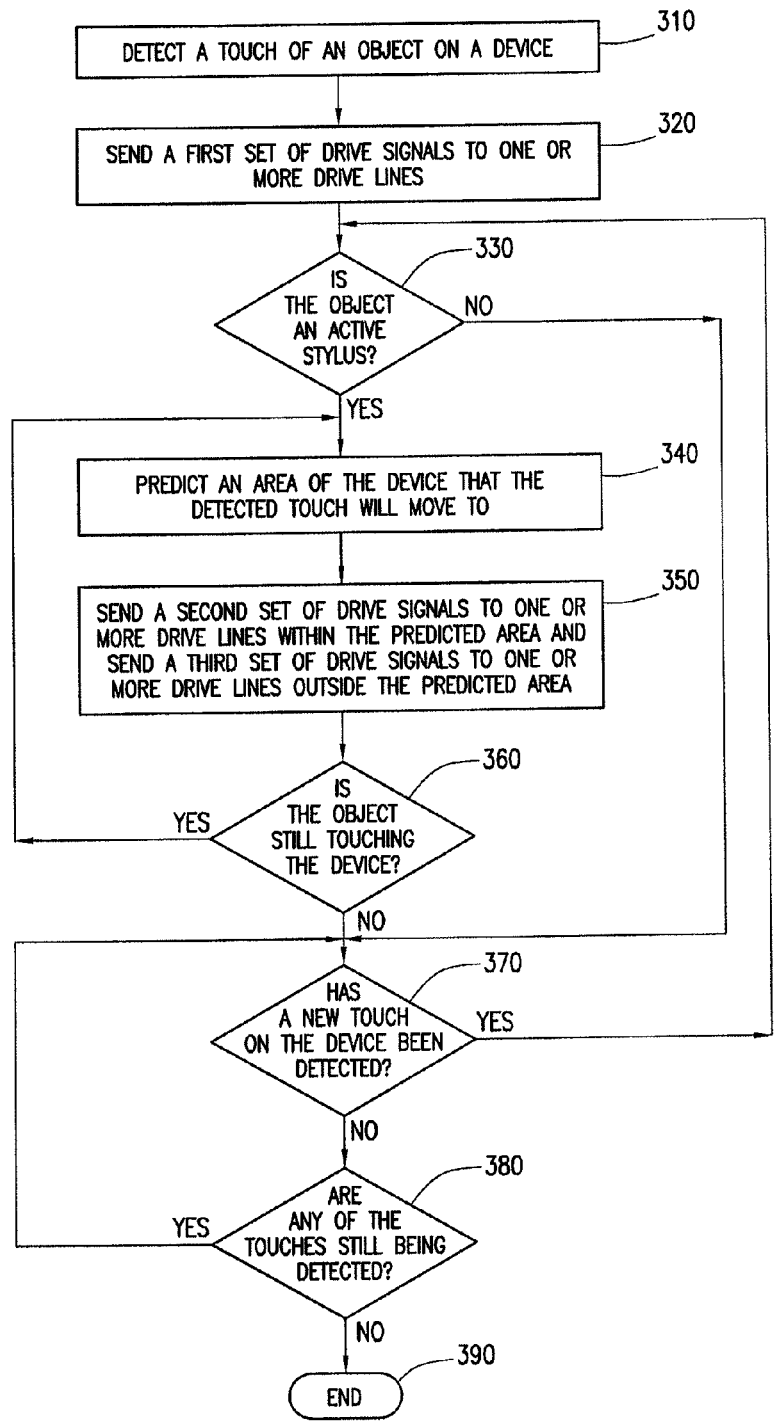
FIG. 4 illustrates another example method for sending drive signals with an increased number of pulses to particular drive lines of a touch sensor.

FIGS. 2-4 illustrate an example touch sensor (such as an example of touch sensor 10 of FIG. 1) and example methods (such as example methods performed by touch sensor 10 of FIG. 1) where drive signals with a first number of pulses are sent to particular drive lines in the touch sensor, and drive signals with a second number of pulses (which is lower than the first number of pulses) are sent to other drive lines in the touch sensor. As such, drives signals with an increased number of pulses (in comparison to the second number of pulses) may be sent to particular drive lines, as opposed to all of the drive lines. This may increase the SNR ratio of the touch sensor while preventing a lower frame rate of the touch sensor and an increased power consumption of the touch sensor, in particular embodiments.

FIG. 2 illustrates an example touch sensor 110 where drive signals with an increased number of pulses are sent to particular drive lines. Touch sensor 110 includes drive lines $X_0$-$X_N$ and sense lines $Y_0$-$Y_N$. Each of drive lines $X_0$-$X_N$ may include one or more drive electrodes, and each of sense lines $Y_0$-$Y_N$ may include one or more sense electrodes. FIG. 2 further illustrates an active stylus 114 touching a touch-sensitive area of a device (not shown).

In operation, a touch-sensor controller (not shown) of touch sensor 110 may send drive signals with an increased number of pulses to particular drive lines $X_0$-$X_N$ in order to detect movement of active stylus 114 while active stylus 114 is touching the device. For example, prior to touch sensor 110 detecting a touch by active stylus 114, the touch-sensor controller may sequentially send a set of drive signals to each of drive lines $X_0$-$X_N$. This set of drive signals may each have a low number of pulses (such as, for example, 8 pulses per drive signal), in particular embodiments. After touch sensor 110 detects a touch by active stylus 114 (or a touch by any other object, such as, for example, a finger or a passive stylus), the touch-sensor controller may send drive signals with an increased number of pulses to each of the drive lines located within touch window 118 (i.e., drive lines $X_2$-$X_6$). These drive signals sent to drive lines $X_2$-$X_6$ may each include any suitable increased number of pulses. For example, the increased number of pulses may be a number of pulses in-between 12 pulses and 63 pulses, such as, for example, 48 pulses, in particular embodiments. As another example, the increased number of pulses may be a number of pulses greater than or equal to 12 pulses, in particular embodiments. As a further example, the increased number of pulses may be a number of pulses greater than or equal to 16 pulses, in particular embodiments.

In addition to sending drive signals with an increased number of pulses to lines $X_2$-$X_6$ (i.e., the drive lines within touch window 118), the touch sensor controller may also send drive signals to the drive lines within portions 122a and 122b (i.e., drive lines $X_0$-$X_1$ and $X_7$-$X_N$) of touch sensor 10. The drive signals sent to each of the drive lines within portions 122a and 122b of touch sensor 110 may have a lower number of pulses than the drive signals sent to the drive lines in touch window 118. For example, while the drive signals sent to the drive lines in touch window 118 may each have a number of pulses in-between 12 pulses and 63 pulses (as an example), the drive signals sent to the drive lines in portions 122a and 122b may each have a number of pulses in-between 8 and 20 pulses, in particular embodiments. As another example, the drive signals sent to the drive lines in portions 122a and 122b may each have a number of pulses less than 22 pulses, in particular embodiments. Although example pulse numbers have been discussed above, the number of pulses in the drive signals sent to the drive lines located within touch window 118 may be any number of pulses that is greater than the number of pulses in the drive signals sent to the drive lines within portions 122a and 122b. Furthermore, the number of pulses in the drive signals sent to the drive lines within portions 122a and 122b may be any number of pulses that is less than the number of pulses in the drive signals sent to the drive lines located within touch window 118.

Additionally, the touch-sensor controller may also modify touch window 118 based on movement of active stylus 114. For example, if a user is using active stylus 114 to draw a line on a device, the user may initially touch the device in a first area and (while still touching the device) move the active stylus 114 another area of the device. The touch-sensor controller may continuously predict an area to which active stylus 114 may move, in particular embodiments. Based on such a prediction, the touch-sensor controller may move (or otherwise modify) touch window 118 to encompass the movement of active stylus 114 (such as to encompass the movement of the active stylus 114 drawing a line on the device), as is discussed in detail with regard to FIG. 3.

By sending drive signals with an increased number of pulses to the drive lines within touch window 118 (as compared to the number of pulses in the drive signals sent to the drive lines within portions 122a and 122b), the touch-sensor controller may be able to provide an increased number of pulses to only the portions of touch sensor 110 that the active stylus 114 is touching (or predicted to touch). This may increase the SNR ratio of touch sensor 110 at those portions (and may also allow the active stylus 114 to receive a sufficient number of pulses for which it was designed to operate), while still keeping the frame rate of touch sensor 110 high and also keeping the power consumption of touch sensor 110 low, in particular embodiments. The increased number of pulses of the drive signals sent to particular drive lines may have various additional technical advantages, such as allowing error correction codes to be utilized by the device (thereby lowering packet rejection rates), allowing additional sensors to be added to the active stylus 114 to report additional metrics such as orientation, acceleration, etc. to the touch-sensor controller, improving the writing experience for a user, and/or allowing writing of even small fonts to be detected by the touch-sensor controller (such as fonts as small as 3 mm, for example), in particular embodiments.

FIG. 3 illustrates an example method for sending drive signals with an increased number of pulses to particular drive lines of a touch sensor. The method may start at step 210, where a touch of an object on a device is detected. The device may be any suitable device, such as, for example, and without limitation, a desktop computer, laptop computer, tablet computer, personal digital assistant (PDA), smart-phone, satellite navigation device, portable media player, portable game console, kiosk computer, point-of-sale device, or any other suitable device. The object may be any suitable object, such as, for example, and without limitation, one or more of a user's fingers, an active stylus, a passive stylus, or any other suitable object. The touch of the object on the device may be detected in any suitable manner. For example, prior to detection of the touch, touch-sensor controller may successively send drive signals to each of the drive lines of the touch sensor. Such drive signals may each have a low number of pulses (such as, for example, 8 pulses), in particular embodiments. Based on these drive signals sent to the drive lines of the touch sensor, a touch-sensor controller may detect the touch of the object on the device by sensing a change in capacitance at a capacitive node of the touch sensor.

At step 220, an area of the device that the detected touch will move to is predicted. The detected touch may move for any suitable reason. For example, a user may touch the device with the object in order to draw a line, draw one or more symbols (such as the symbol "A"), drag an object displayed on the device to another area of the device, or for any other suitable reason. The area of the device that the detected touch will move to may be predicted in any suitable manner. In particular, any suitable variables may be utilized to predict the area of the device that the detected touch will move to. As a first example, the prediction may be based on an area in which the detected touch occurred. In such an example, if the object was detected as touching an area corresponding to the intersection of drive line $X_4$ and sense line $Y_2$ (as is illustrated in FIG. 2), the area of the device that the detected touch will move to may be predicted based on that area (i.e., the intersection of drive line $X_4$ and sense line $Y_2$). As a second example, the prediction may be based on the size of the object's footprint. In particular, an active stylus may have a different footprint than a user's finger and/or a passive stylus. These differences in footprints may be taken into account when predicting the area of the device that the detected touch will move to. As a third example, the prediction may be based on the fastest speed of travel of the object. In particular, the fastest speed of travel of an object may be, for example, 200 millimeters per second (mm/s). As such, the touch-sensor controller may take this 200 mm/s speed into account when predicting the area of the device that the detected touch will move to. As a fourth example, the prediction may be based on a frame rate (such as, for example, a minimum frame rate) of the device and/or the touch sensor. In particular, a device may be designed to operate at a high frame rate, such as, for example, 100 Hz. Such a high frame rate may reduce the area of the device to which an object could potentially move within each frame. As such, the touch-sensor controller may take this frame rate into account when predicting the area of the device that the detected touch will move to. As a fifth example, the prediction may be based on a latency between the end of a scan by the touch sensor and the determination of a position of an object based on this scan. In particular, there may be a delay in-between when the scan of the touch sensor ends (i.e., when a set of drive signals has been sequentially sent to each of the drive lines of the touch sensor) and when the position of the object is determined based on this scan. As such, the touch-sensor controller may take this latency into account when predicting the area of the device that the detected touch will move to. As a sixth example, the prediction may be based on the drive line pitch of the touch sensor. In particular, as the pitch of the drive lines increases, the number of drive lines that the object can potentially move to in-between each frame decreases (or vice versa). As such, the touch-sensor controller may take this drive line pitch into account when predicting the area of the device that the detected touch will move to.

One or more of the variables described above may be utilized in order to predict the area of the device that the detected touch will move to, in particular embodiments. For example, the area may be predicted using each of the above described variables, as is seen by the following equation:

$$NX_p = NX_{object} + \frac{2v_{object}N_{latency}}{X_{pitch}F}$$

where $NX_{object}$ is the size of the object's foot print
where $V_{object}$ is the fastest speed of travel of the object
where $N_{latency}$ is the latency between the end of a scan of the touch sensor and the determination of a position of an object based on this scan
where $X_{pitch}$ is the drive line pitch
where F is the frame rate Such an equation may determine the number of drive lines that the object can potentially move to during each frame. For example, such an equation may determine that the number of drive lines that the object can potentially move to during each frame is a number in-between 2-8 drive lines, such as 5 drive lines. As such, if the touch of the object is detected on, for example, drive line $X_4$ (as is illustrated in FIG. 2), the predicted area that the device will move to may include the two drive lines above drive line $X_4$ (i.e., drive lines $X_2$ and $X_3$) and the two drive lines below drive line $X_4$ (i.e., drive line $X_5$ and $X_6$), for a total area of 5 drive lines. Any other suitable number of drive lines may be used to predict the area to which the detected touch will move to, in particular embodiments. For example, the number of drive lines may include 1 drive line, 2 drive lines, 3 drive lines, 5 drive lines, 6 drive lines, 7 drive lines, 10 drive lines, or any other suitable number of drive lines. The predicted area that the detected touch will move to may be determined in any other suitable manner and/or using any other suitable equation.

At step 230, a first set of drive signals is sent to one or more drive lines within the predicted area and a second set of drive signals is sent to one or more drive lines outside the predicted area. For example, with regard to FIG. 2, the first set of drive signals (which may be referred to as "precision drive signals") may be sent to the drive lines within touch window 118 (i.e., drive lines $X_2$-$X_6$), and the second set of drive signals may be sent to the drive lines within portions 122a and 122b (i.e., drive lines $X_0$-$X_1$ and $X_7$-$X_N$). The first set of drive signals (which may be referred to as "non-precision active drive signals") may each have a first number of pulses and the second set of drive signals each have a second number of pulses. Furthermore, the first number of pulses (of the first set of drive signals) may be greater than the second number of pulses (of the second set of drive signals). For example, the first number of pulses may be a number of pulses greater than or equal to 12 pulses and less than or equal to 63 pulses (such as, for example, 48 pulses), greater than or equal to 12 pulses, greater than or equal to 16 pulses (such as, for example 22 pulses), or any other suitable number of pulses. On the other hand, the second number of pulses (of the second set of drive signals) may be any number that is lower than the first number of pulses (of the first set of drive signals). For example, the second number of pulses may be a number of pulses greater than or equal to 8 pulses and less than or equal to 12 pulses, greater than or equal to 12 pulses and less than or equal to 20 pulses, greater than or equal to 12 pulses and less than or equal to 22 pulses, or any other number of pulses that is below the first number of pulses.

At step 240, it is determined whether the object is still touching the device. If the object is still touching the device, the method may move back to step 220, where the area of the device that the detected touch will move to is once again predicted. As an example, with regard to FIG. 2, if the object is still touching the device and has moved from drive line $X_4$ to drive line $X_5$ (i.e., a user is drawing a vertical line), the touch-sensor controller may then predict the area of the device that the detected touch will move to from drive line $X_5$. For example, since the object may now be detected as touching drive line $X_5$, the area of the device that the detected touch will move to may be predicted to include drive lines $X_3$-$X_7$ (for a total of 5 drive lines).

On the other hand, if the object is determined to not still be touching the device (such as if the user is no longer touching the device with his finger), the method may move to step 250, where a third set of drive signals is sent to the one or more drive lines within the predicted area and the one or more drive lines outside the predicted area. For example, with regard to FIG. 2, if the object is determined to not be touching the device anymore, a third set of drive signals may be sent to each of drive lines $X_0$-$X_N$. The third set of drive signals may each have a third number of pulses. The third number of pulses may include any suitable number of pulses that is lower that the first number of pulses (of the first set of drive signals). For example, the third number of pulses may be equal to the second number of pulses (of the second set of drive signals). As another example, the third number of pulses may be lower than both the second number of pulses (of the second set of drive signals) and the first number of pulses (of the first set of drive signals). In such an example, if the second number of pulses is greater than or equal to 13 pulses, the third number of pulses may be greater than or equal to 8 pulses and less than 13 pulses. The third number of pulses may be any number of pulses that may allow the touch sensor to detect a touch, in particular embodiments.

At step 260, it is determined whether a new touch on the device has been detected. If a new touch on the device has been detected, the method may move to step 220, where the area of the device that the detected touch will move to is predicted. On the other hand, if a new touch on the device has not been detected, the method may move to step 270, where the method ends.

The steps of the method of FIG. 3 may be repeated, where appropriate. Moreover, although this disclosure describes and illustrates particular steps of the method of FIG. 3 as occurring in a particular order, this disclosure contemplates any suitable steps of the method of FIG. 3 occurring in any suitable order. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

FIG. 4 illustrates another example method for sending drive signals with an increased number of pulses to particular drive lines of a touch sensor. The method of FIG. 4 may be different from the method of FIG. 3 in that the method of FIG. 4 may include different steps depending on the type of object that is detected as touching the device. For example, the method of FIG. 4 may include different steps if an active stylus is detected as touching the device (as opposed to the user's finger or a passive stylus).

The method begins at step 310, where the touch of an object on a device is detected. The device may be any suitable device, such as, for example, and without limitation, a desktop computer, laptop computer, tablet computer, personal digital assistant (PDA), smartphone, satellite navigation device, portable media player, portable game console, kiosk computer, point-of-sale device, or any other suitable device. The object may be any suitable object, such as, for example, and without limitation, one or more of a user's fingers, an active stylus, a passive stylus, or any other suitable object. The touch of the object on the device may be detected in any suitable manner. For example, prior to detection of the touch, touch-sensor controller may successively send drive signals to each of the drive lines of the touch sensor. Such drive signals may be referred to as "idle drive signals." Such idle drive signals may each have a low number of pulses (such as, for example, 8 pulses), in particular embodiments. Based on these idle drive signals sent to the drive lines of the touch sensor, a touch-sensor controller may detect the touch of the object on the device by sensing a change in capacitance at a capacitive node of the touch sensor.

At step 320, a first set of drive signals is sent to one or more drive lines. The first set of drive signals may be sent to the one or more drive lines in response to the touch-sensor controller moving from an "idle" stage to "active" stage as a result of the detected touch, in particular embodiments. The first set of drive signals may be referred to as "active drive signals." The first set of drive signals may have a first number of pulses. Furthermore, the first number of pulses may be any suitable number of pulses greater than the number of pulses in the idle drive signals. For example, the idle drive signals may each include 8 pulses, while the first set of drive signals may each include any number of pulses greater than 8 pulses, such as, for example, 16 pulses. As another example, the first number of pulses may have any number of pulses greater than or equal to 12 pulses and less than or equal to 20 pulses, in particular embodiments. Additionally, although the first number of pulses has been described above as being any suitable number of pulses greater than the number of pulses in the idle drive signals, in particular embodiments, the first number of pulses may be equal to the number of pulses in the idle drive signals.

At step 330, it is determined whether the object is an active stylus. This determination may be made in any suitable manner. For example, the touch-sensor controller may determine that the object is an active stylus based on the size of the foot print of the object, based on the change in capacitance at a capacitive node of the touch sensor, or based on any other suitable detected variable. If the object is not an active stylus (such as if the object is a user's finger, a passive stylus, or any other object) the method may move to step 370, where it is determined whether a new touch on the device has been detected (discussed below). On the other hand, if the object is determined to be an active stylus, the method may move to step 340.

As step 340, an area of the device that the detected touch will move to is predicted. Step 340 of FIG. 4 may be substantially similar to step 220 of FIG. 3, in particular embodiments. For example, the area of the device that the detected touch will move to may be predicted based on any suitable variables, such as an area in which the detected touch occurred, the object's footprint, the fastest speed of travel of the object, a frame rate of the device and/or the touch sensor, a latency between the end of a scan by the touch sensor and the determination of a position of an object based on this scan, the drive line pitch of the touch sensor, or any combination of the preceding. Furthermore, the area may be predicted based on the equation discussed in FIG. 3, or based on any other suitable equation.

At step 350, a second set of drive signals is sent to one or more drive lines within the predicted area and a third set of drive signals is sent to one or more drive lines of the predicted area. The second set of drive signals may be referred to as "precision drive signals" and the third set of drive signals may be referred to as "non-precision active drive signals." Step 350 of FIG. 4 may substantially similar to step 230 of FIG. 3, in particular embodiments. For example, with regard to FIG. 2, the second set of drive signals may be sent to the drive lines within touch window 118 (i.e., drive lines $X_2$-$X_6$), and the third set of drive signals may be sent to the drive lines within portions 122a and 122b (i.e., drive lines $X_0$-$X_1$ and $X_7$-$X_N$).

The second set of drive signals may each include a second number of pulses that is greater than the first number of pulses. For example, the second number of pulses may be any number of pulses greater than or equal to 20 pulses and less than or equal to 63 pulses (such as, for example, 48 pulses), in particular embodiments. As another example, the second number of pulses may be any number of pulses greater than or equal to 16 pulses, in particular embodiments. Additionally, the third set of drive signals may each include a third number of pulses that is less than the second number of pulses. For example, the third number of pulses may be any number of pulses greater than or equal to 12 pulses and less than or equal to 20 pulses (such as, for example, 12 pulses), in particular embodiments. As another example, the third number of pulses may be any number of pulses less than or equal to 20 pulses, in particular embodiments. The third number of pulses may be any number of pulses less than or equal to the first number of pulses (of the first set of drive signals), in particular embodiments. For example, the third number of pulses may be a number of pulses that is 75% of the first number of pulses. This may allow the scan of these portions of the touch sensor to be quicker (i.e., because the drive signals for those portions have a smaller number of pulses, which increases the frame rate), in particular embodiments. As another example, the third number of pulses may be any number of pulses that may allow the touch-sensor controller to simultaneously detect multiple objects touching the device (such as simultaneously detect both a user's fingers and a stylus touching the device).

At step 360, it is determined whether the object is still touching the device. Step 360 of FIG. 4 may be substantially similar to step 240 of FIG. 3, in particular embodiments. For example, if the object is still touching the device, the method may move back to step 340, where the area of the device that the detected touch will move to is once again predicted. On the other hand, if the object is determined to not still be touching the device (such as if the user is no longer touching the device with the active stylus), the method may move to step 370. Furthermore, in addition to moving to step 370, the method may further include a step where a new set of drive signals is sent to each of the drive lines of the touch sensor. For example, since the active stylus is no longer touching the device, the second set of drive signals (i.e., the precision drive signals) and the third set of drive signals (i.e., the non-precision active drive signals) may no longer be sent. Instead the new set of drive signals may be sent. The new set of dive signals may be substantially similar to the first set of signals (discussed in step 320 and referred to as active drive signals).

At step 370, it is determined whether a new touch on the device has been detected. Whether a new touch on a device has been detected may be determined based on a change in capacitance on a capacitive node of the touch sensor, in particular embodiments. A new touch may include any touch that is different from the previous detected touch. For example, the new touch may be a subsequent touch by the same object that previously touched the device. In particular, a user may have first touched the device with their finger, picked up their finger, and then subsequently touched the device with the same finger. As a further example, the new touch may be by a different object than was previously detected. In particular, the first touch may have been by an active stylus and the new touch may be by a user's finger (after the active stylus is no longer touching the device or while the active stylus is still touching the device). If a new touch on the device has been detected, the method may move back to step 330, where it is determined whether the object is an active stylus. On the other hand, if a new touch on the device has not been detected, the method may move to step 380.

At step 380, it is determined whether any of the touches are still being detected. If any of the previous touches are still being detected, the method may move back to step 370, where it is once again determined whether a new touch on the device has been detected. On the other hand, if none of the touches are still being detected, the method may move to step 390, where the method ends. When the method ends, the touch-sensor controller may once again being sending idle drive signals (discussed above with regard to step 310), thereby allowing the touch-sensor to be able to detect a touch of an object on the device, in particular embodiments.

The steps of the method of FIG. 4 may be repeated, where appropriate. Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Although the methods of FIG. 3 and FIG. 4 have been illustrated as including particular steps, in particular embodiments, the methods of FIG. 3 and FIG. 4 may include additional steps. For example, the methods of FIG. 3 and FIG. 4 may further include determining the first number of pulses (for FIG. 3) or determining a second number of pulses (for FIG. 4), in particular embodiments. The first number of pulses of FIG. 3 (or the second number of pulses of FIG. 4) may be determined based on any suitable variables, such as power savings of the device, frame rate of the device, SNR ratio of the device, any other suitable variables, or any combination of the preceding. For example, a user may select a setting on the device that indicates that the user would like to operate the device in a power savings mode. Based on this indication, the touch-sensor controller may determine the number of pulses designed to cause a power savings of the device. As another example, the first number of pulses of FIG. 3 (or the second number of pulses of FIG. 4) may be determined based on an indication corresponding to a frame rate of the device. In particular, the device may be designed to operate at a frame rate above 100 Hz. Based on such an indication, the touch-sensor controller may determine the number of pulses designed to satisfy such a frame rate. As a further example, the first number of pulses of FIG. 3 (or the second number of pulses of FIG. 4) may be determined based on an indication corresponding to a SNR ratio of the device. In particular, the touch sensor may work best if it has a high SNR ratio. As such, if the touch-sensor controller receives an indication corresponding to a high SNR ratio, the touch-sensor controller may determine the number of pulses designed to satisfy such a high SNR ratio.

Furthermore, although the methods of FIG. 3 and FIG. 4 have been illustrated as including steps based on detection of a touch of an object, in particular embodiments, the steps of FIG. 3 and FIG. 4 may be based on detection of a touch of an object and/or a proximity of an object. For example, the first set of drive signals of FIG. 4 (referred to as active drive signals) may be sent in response to detecting a proximity of the object.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   detecting a touch of an object on a device;
   predicting an area of the device to which the detected touch will move;
   sending, in response to predicting the area of the device to which the detected touch will move, a first set of drive signals to one or more drive lines within the predicted area, the first set of drive signals each having a first number of pulses; and
   sending, in response to predicting the area of the device to which the detected touch will move, a second set of drive signals to one or more drive lines outside the predicted area, the second set of drive signals each having a second number of pulses, wherein the first number of pulses is greater than the second number of pulses and wherein both the first number of pulses and the second number of pulses are a non-zero number of pulses.

2. The method of claim 1, further comprising:
   detecting that the object is not touching the device anymore; and
   in response to the detected absence of touch, sending a third set of drive signals to the one or more drive lines within the predicted area and the one or more drive lines outside the predicted area, the third set of drive signals each having a third number of pulses, wherein the third number of pulses is lower than the second number of pulses and the first number of pulses.

3. The method of claim 1, further comprising:
   predicting a second area of the device to which the detected touch will move;
   sending a third set of drive signals to one or more drive lines within the second predicted area, the third set of drive signals each having a third number of pulses; and
   sending a fourth set of drive signals to one or more drive lines outside the second predicted area, the fourth set of drive signals each having a fourth number of pulses, wherein the third number of pulses is greater than the fourth number of pulses.

4. The method of claim 1, wherein the object is selected from a group consisting of:
   a user's finger;
   an active stylus; and
   a passive stylus.

5. The method of claim 1, further comprising determining the first number of pulses based at least on one or more of:
   an indication corresponding to a power savings of the device;
   an indication corresponding to a frame rate of the device; and
   an indication corresponding to a signal to noise ratio (SNR) of the device.

6. The method of claim 1, wherein the first number of pulses is greater than or equal to 16 pulses.

7. The method of claim 1, wherein the first number of pulses is greater than or equal to 12 pulses and less than or equal to 63 pulses.

8. One or more computer-readable non-transitory storage media embodying logic that is operable when executed to:
   detect a touch of an object on a device;
   predict an area of the device to which the detected touch will move;
   send, in response to predicting the area of the device to which the detected touch will move, a first set of drive signals to one or more drive lines within the predicted area, the first set of drive signals each having a first number of pulses; and
   send, in response to predicting the area of the device to which the detected touch will move, a second set of drive signals to one or more drive lines outside the predicted area, the second set of drive signals each having a second number of pulses, wherein the first number of pulses is greater than the second number of pulses and wherein both the first number of pulses and the second number of pulses are a non-zero number of pulses.

9. The media of claim 8, wherein the logic is further operable when executed to:
   detect that the object is not touching the device anymore; and
   in response to the detected absence of touch, send a third set of drive signals to the one or more drive lines within the predicted area and the one or more drive lines outside the predicted area, the third set of drive signals each having a third number of pulses, wherein the third number of pulses is lower than the second number of pulses and the first number of pulses.

10. The media of claim 8, wherein the logic is further operable when executed to:
    predict a second area of the device to which the detected touch will move;
    send a third set of drive signals to one or more drive lines within the second predicted area, the third set of drive signals each having a third number of pulses; and
    send a fourth set of drive signals to one or more drive lines outside the second predicted area, the fourth set of drive signals each having a fourth number of pulses, wherein the third number of pulses is greater than the fourth number of pulses.

11. The media of claim 8, wherein the object is selected from a group consisting of:
   a user's finger;
   an active stylus; and
   a passive stylus.

12. The media of claim 8, wherein the predicted area is based at least on an area in which the detected touch occurred.

13. The media of claim 8, wherein the logic is further operable when executed to determine the first number of pulses based at least on one or more of:
   an indication corresponding to a power savings of the device;
   an indication corresponding to a frame rate of the device; and
   an indication corresponding to a signal to noise ratio (SNR) of the device.

14. A device comprising:
   a touch sensor; and
   a touch-sensor controller operable to:
      detect a touch of an object on a device;
      determine whether the object is a stylus;
      perform, based on determining that the object is a stylus, operations comprising:
         predicting an area of the device to which the detected touch will move;
         sending a first set of drive signals to one or more drive lines within the predicted area, the first set of drive signals each having a first number of pulses; and
         sending a second set of drive signals to one or more drive lines outside the predicted area, the second set of drive signals each having a second number of pulses, wherein the first number of pulses is greater than the second number of pulses and wherein both the first number of pulses and the second number of pulses are a non-zero number of pulses.

15. The device of claim 14, wherein the touch-sensor controller is further operable to:
   detect that the object is not touching the device anymore; and
   in response to the detected absence of touch, send a third set of drive signals to the one or more drive lines within the predicted area and the one or more drive lines outside the predicted area, the third set of drive signals each having a third number of pulses, wherein the third number of pulses is lower than the second number of pulses and the first number of pulses.

16. The device of claim 14, wherein the touch-sensor controller is further operable to:
   predict a second area of the device to which the detected touch will move;
   send a third set of drive signals to one or more drive lines within the second predicted area, the third set of drive signals each having a third number of pulses; and
   send a fourth set of drive signals to one or more drive lines outside the second predicted area, the fourth set of drive signals each having a fourth number of pulses, wherein the third number of pulses is greater than the fourth number of pulses.

17. The device of claim 14, wherein the object is selected from a group consisting of:
   a user's finger;
   an active stylus; and
   a passive stylus.

18. The device of claim 14, wherein the predicted area is based at least on an area in which the detected touch occurred.

19. The device of claim 14, wherein the touch-sensor controller is further operable to determine the first number of pulses based at least on one or more of:
   an indication corresponding to a power savings of the device;
   an indication corresponding to a frame rate of the device; and
   an indication corresponding to a signal to noise ratio (SNR) of the device.

20. The method of claim 1, wherein predicting the area of the device to which the detected touch will move comprises calculating the predicted area to which the detected touch will move according to the following formula:

$$NX_p = NX_{object} + \frac{2v_{object}N_{latency}}{X_{pitch}F},$$

where:
   $NX_{object}$ is a size of a footprint of the object;
   $v_{object}$ is a fastest speed of travel of the object;
   $N_{latency}$ is a latency between an end of a scan of a touch sensor and a determination of a position of the object based on the scan;
   $X_{pitch}$ is a drive line pitch of the touch sensor; and
   F is a frame rate.

* * * * *